United States Patent [19]

Mimica

[11] Patent Number: 5,211,518

[45] Date of Patent: May 18, 1993

[54] MOTOR VEHICLE TRAILER FOR HAULING STEEL COILS

[75] Inventor: Ognjen Mimica, Homewood, Ill.

[73] Assignee: QCX Partners, Inc., Flossmoor, Ill.

[21] Appl. No.: 705,550

[22] Filed: May 24, 1991

[51] Int. Cl.$^5$ .............................................. B60P 7/12
[52] U.S. Cl. ...................................... 410/50; 296/100; 296/182; 410/49; 410/144; 410/100
[58] Field of Search .................... 410/36, 42, 47, 48, 410/49, 50, 143, 144, 152, 97, 100; 296/100, 102, 105, 182

[56] References Cited

U.S. PATENT DOCUMENTS

| | | |
|---|---|---|
| 2,122,959 | 7/1938 | Scharff . |
| 2,806,436 | 9/1957 | Johnston ......................... 410/152 X |
| 2,817,304 | 12/1957 | Newcomer et al. . |
| 3,186,357 | 6/1965 | Fillion ................................. 410/49 |
| 3,291,072 | 12/1966 | Cunningham ....................... 410/49 |
| 3,307,495 | 3/1967 | Chapman et al. .................... 410/49 |
| 3,307,497 | 3/1967 | Chapman et al. . |
| 3,353,506 | 11/1967 | Snyder et al. ....................... 410/49 |
| 3,363,938 | 1/1968 | Schultz ............................... 296/182 |
| 3,413,931 | 12/1968 | Augustine, Jr. ................. 410/144 X |
| 3,481,627 | 12/1969 | Felburn ............................... 410/50 |
| 3,605,638 | 9/1971 | James . |
| 3,715,993 | 2/1973 | Orlik . |
| 3,735,998 | 5/1973 | Green ........................... 296/182 X |
| 3,753,407 | 8/1973 | Tilseth . |
| 3,774,552 | 11/1973 | Snyder et al. ....................... 410/152 |
| 3,812,791 | 5/1974 | Barnard ......................... 410/49 X |
| 3,897,100 | 7/1975 | Gardner .............................. 296/100 X |
| 3,909,059 | 9/1975 | Benninger et al. ............... 296/182 |
| 3,922,004 | 11/1975 | Chamberlain ........................ 410/49 |
| 3,994,240 | 11/1976 | Berg et al. ...................... 410/47 X |
| 4,451,188 | 5/1984 | Smith et al. ....................... 410/49 X |
| 4,534,589 | 8/1985 | Booher ............................... 296/182 |
| 4,702,653 | 10/1987 | Gaulding et al. .................. 410/144 |
| 4,732,528 | 3/1988 | Good . |
| 4,787,669 | 11/1988 | Wante ................................ 296/182 |

FOREIGN PATENT DOCUMENTS

| | | | |
|---|---|---|---|
| 35449 | 9/1981 | European Pat. Off. ............. 296/182 |
| 3312001 | 10/1984 | Fed. Rep. of Germany ...... 296/100 |
| 56-47320 | 4/1981 | Japan ................................ 296/100 |
| 650863 | 3/1979 | U.S.S.R. ............................. 410/49 |

OTHER PUBLICATIONS

A four-page brochure entitled, "Platform Trailer Quality Features," from Great Dane Trailers of Savannah, Ga., Form #433-689-10.

A two-page brochure entitled, "Straight Frame Platform Trailers" from Great Dane Trailers of Savannah, Ga., Form #S-422-189.

A two-page brochure entitled, "Fruehauf All Purpose Steel Platform Trailer—Model PBA", by Fruehauf Trailer Operations #9803R.

One-page advertising copy from Fontaine Trailer Company of Haleyville, Ala., entitled "Introducing the 'Elite Edition'".

Primary Examiner—Michael S. Huppert
Assistant Examiner—Robert S. Katz
Attorney, Agent, or Firm—Jenner & Block

[57] ABSTRACT

A vehicular trailer includes a platform defining a recess into which articles to be transported are placed. Laterally extending hanger members and longitudinally extending support beams form a cradle for supporting the articles.

19 Claims, 7 Drawing Sheets

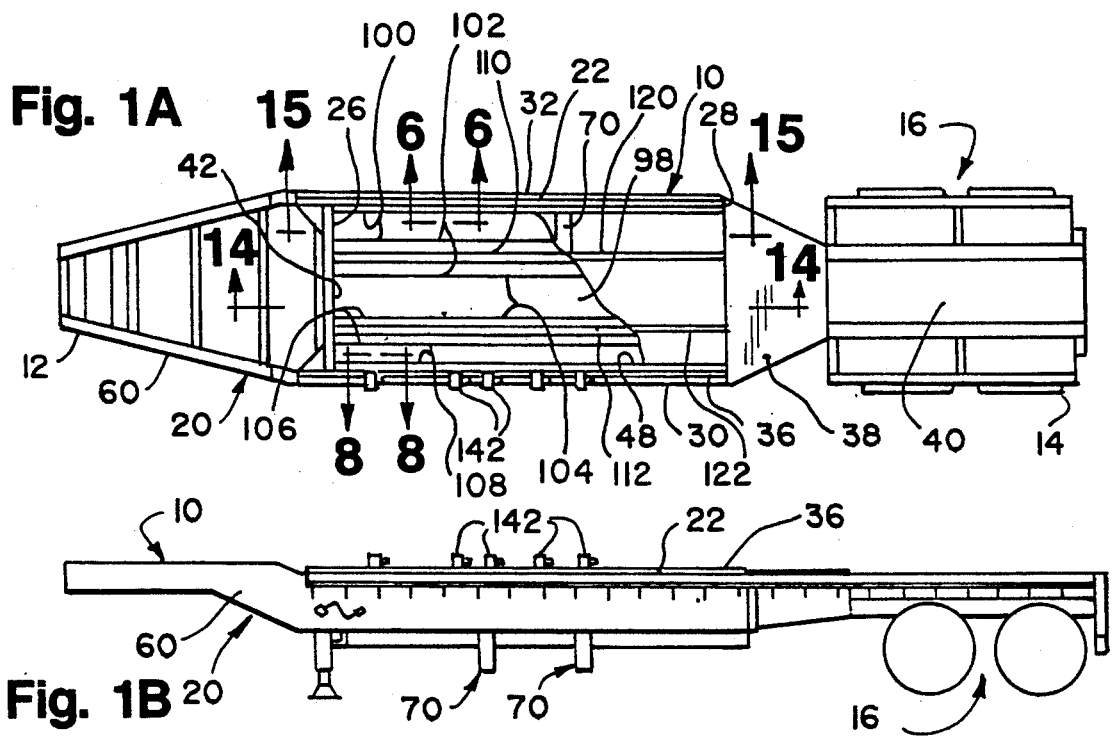
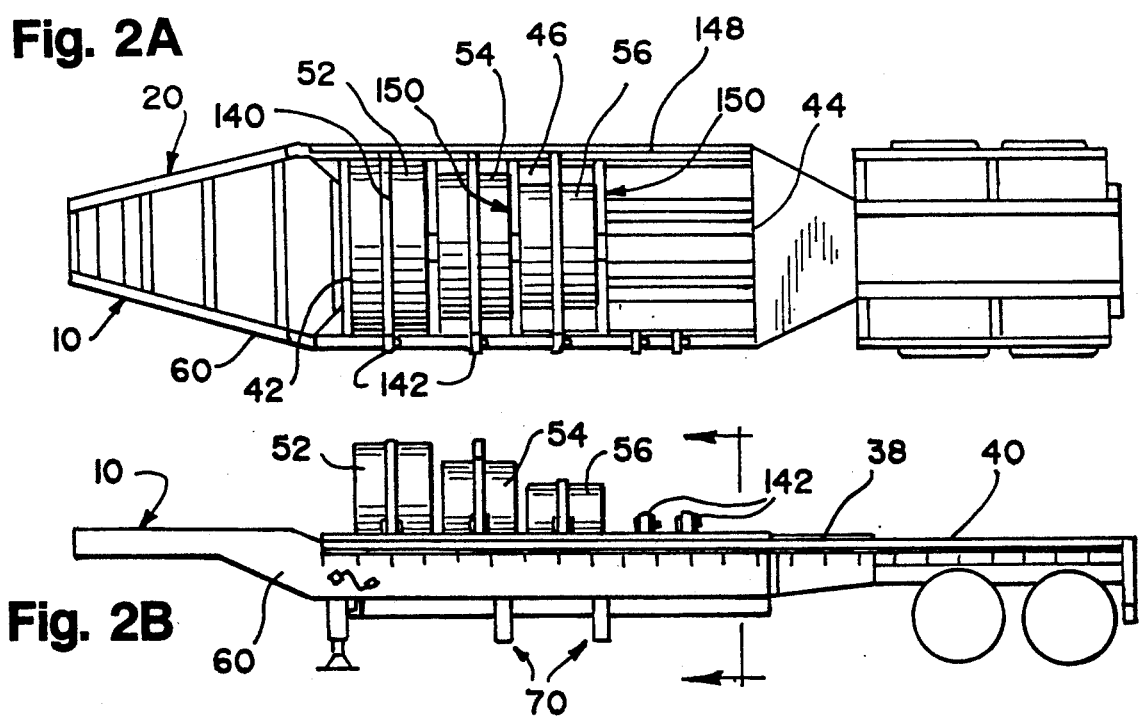

Fig. 3A
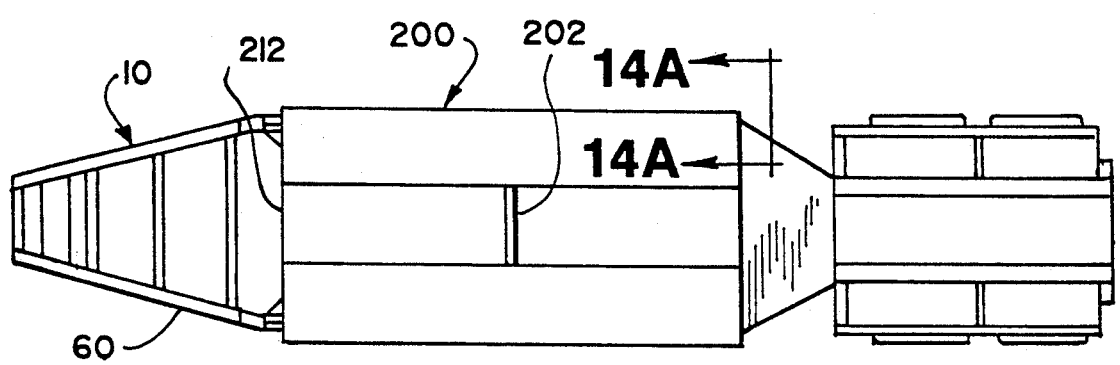
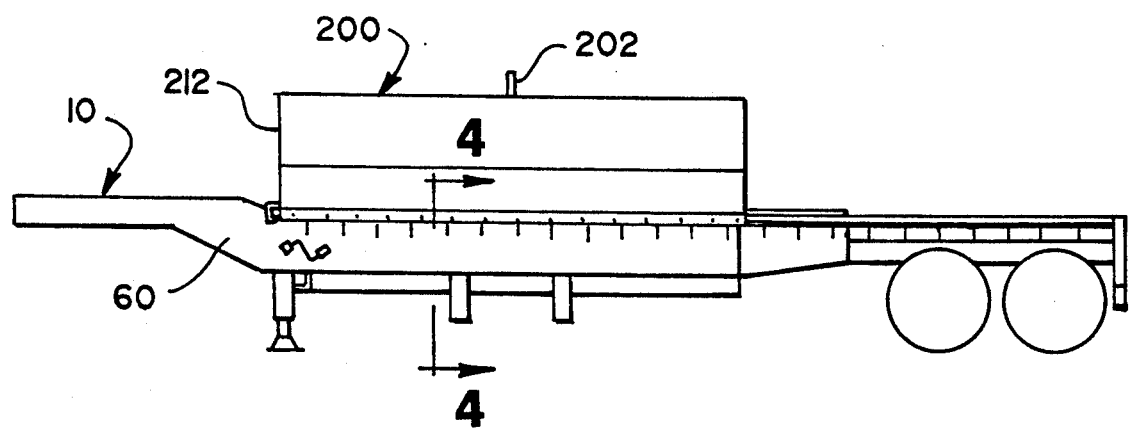
Fig. 3B

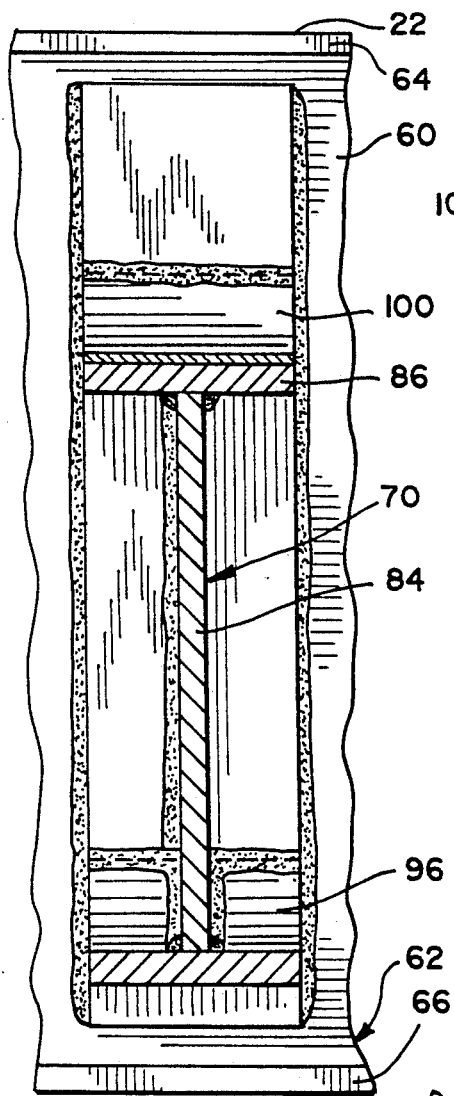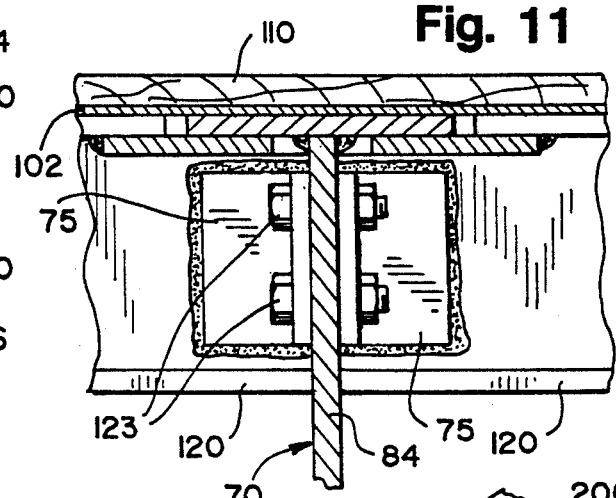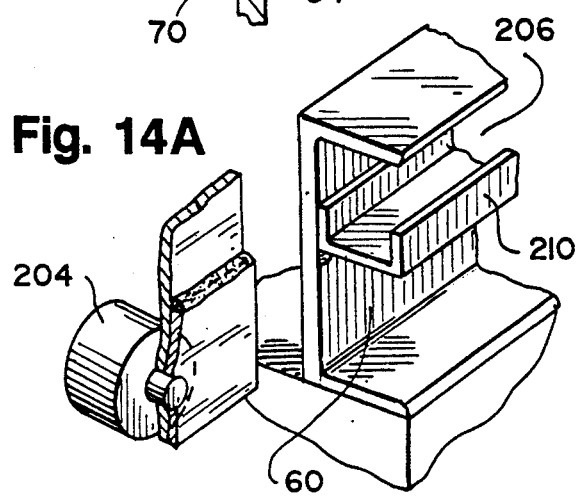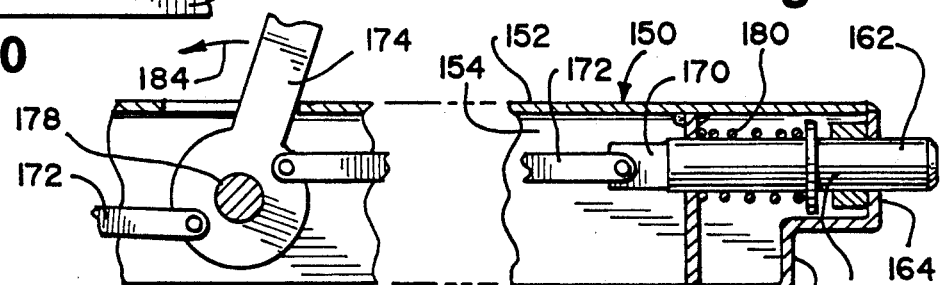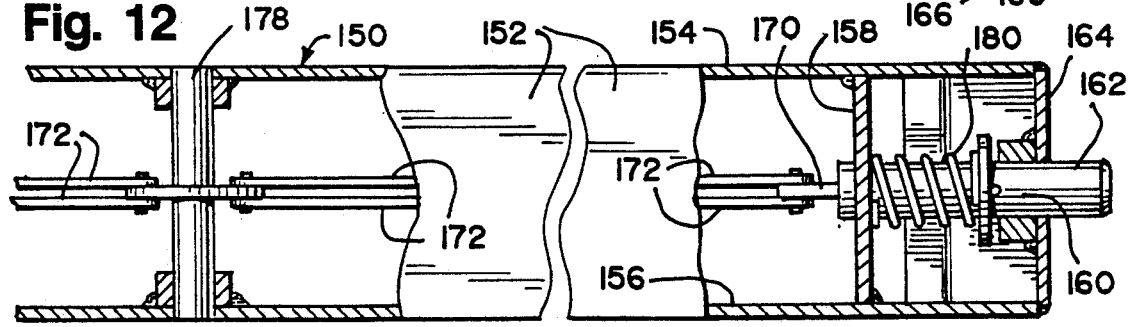

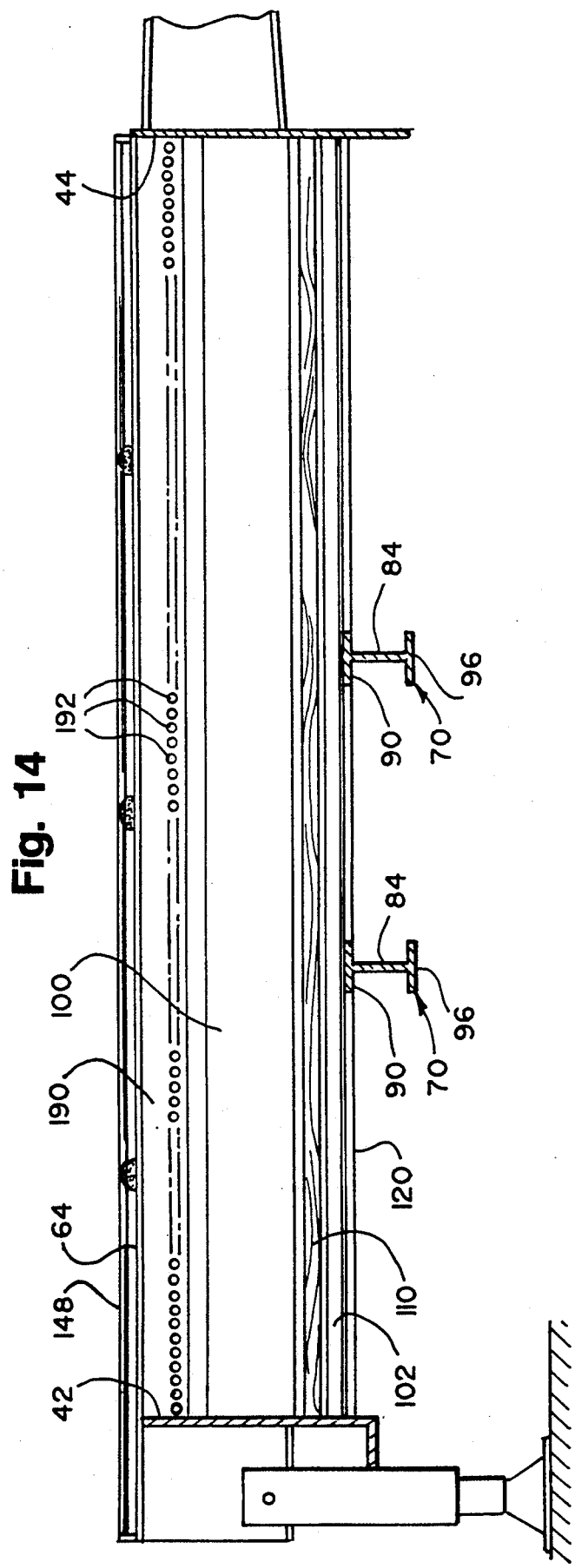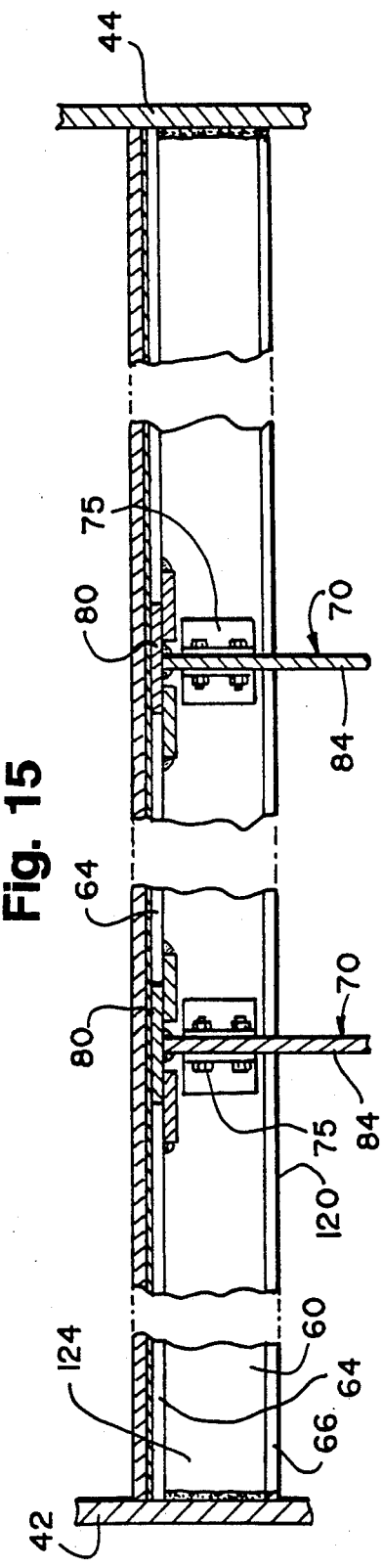

MOTOR VEHICLE TRAILER FOR HAULING STEEL COILS

BACKGROUND OF THE INVENTION

1. Field of the Invention

The present invention pertains to truck trailers for hauling relatively large, dense objects, and in particular to heavy objects such as steel coils which are heavy, yet relatively delicate, and which have rounded surfaces.

2. Description of the Related Art

Different types of products being shipped today over the road require special handling considerations. For example, special considerations must be given when hauling steel products by truck. Steel products are shipped in a variety of different configurations, including flats, rounds, and coils. In the past, it has been found desirable to have a single type of truck trailer haul the various steel products. So-called platform trailers have been employed to ship the various types of steel products. Flats and rounds are typically cut in fairly long lengths, and are typically laid along the major axis of the platform trailer.

Outside of weight considerations and considerations of trailer loading capability, careful attention must be paid to avoid shifting the steel load on the platform trailer, particularly when the trailer, travelling on the highway at customary speeds, is brought to a sudden stop. The shipping of steel coils raises other considerations, in addition to those already mentioned. Steel coils, by their nature, have rounded surfaces on which the coils can roll. Thus, if the coils should become dislodged from a moving trailer it is possible that the coils will roll into traffic before coming to rest. Further, even when the coils are securely restrained on a platform trailer, great care must be exercised to insure the coils do not rock back and forth on their rounded surfaces, thereby being allowed to build up momentum which might overtax the securing devices.

Further considerations are raised when hauling steel coils, which are unique to that steel product configuration. Basically, the steel coil comprises a winding of steel sheeting which is coiled for convenient bulk transport. With current manufacturing techniques, including "just-in-time" techniques, and zero defect manufacturing tolerances, consumers of the steel coils have demanded that the coils be shipped without damage of virtually any kind, so that the coils can be unloaded and set up at the last minute in a manufacturing operation. The steel coils are quite massive, and are typically supported on end, along a tangent line to the curved surface of the coil. Due to the mass of the coil, this results in a relatively high pressure being applied to local portions of the steel coil, which is amplified as the coil shifts or rocks during transport. Considerable attention has been paid to the special handling required for steel coils, and an improved motor vehicle trailer has been sought.

SUMMARY OF THE INVENTION

It is an object according to the present invention to provide a vehicular trailer apparatus for conveying articles having rounded surfaces, such as steel coils.

Another object according to the present invention is to provide a vehicular trailer apparatus with improved, cradled securement of the articles being transported.

Yet another object according to the present invention is to provide an improved adjustable load brace for securing articles in a vehicular trailer apparatus.

Yet another object according to the present invention is to provide a vehicular trailer apparatus of lighter weight, yet which is able to carry a greater payload.

These and other objects according to the present invention, which will become apparent from studying the appended description and drawings, is provided in a vehicular trailer apparatus for carrying articles, comprising:

platform means having a pair of laterally opposed sides, front and rear end portions and opposed upper and lower surfaces extending between the sides and the front and rear end portions;

sidewalls downwardly depending from the platform sides to form outside corners at the upper surface of the platform, at a joinder of the sidewalls and platform sides;

said platform means including at least one interior edge forming an internal recess in said platform;

hanger means extending between said sidewalls, below said platform and including a pair of laterally opposed, upwardly facing support surfaces inclined toward one another and located below said platform recess;

forward and rearward endwalls downwardly extending from said platform;

a pair of elongated support beams having forward and rearward ends supported by said forward and rearward endwalls and said hanger means, including upwardly facing support surfaces for supporting said articles; and said support beams and said platform interior edges forming a pocket for receiving said articles to be carried by said vehicular trailer apparatus.

BRIEF DESCRIPTION OF THE DRAWINGS

FIG. 1A is a top plan view of vehicular trailer apparatus illustrating principles according to the present invention;

FIG. 1B is a side elevational view thereof;

FIG. 2A is a top plan view thereof showing a steel coil payload positioned in the vehicular trailer apparatus;

FIG. 2B is a side elevational view thereof;

FIG. 3A is a top plan view thereof, shown with a protective cover installed;

FIG. 3B is a side elevational view thereof;

FIG. 10 is a fragmentary cross-sectional view taken along the line 10—10 of FIG. 4;

FIG. 11 is a fragmentary cross-sectional view taken along the line 11—11 of FIG. 4;

FIG. 12 is a fragmentary cross-sectional view taken along the line 12—12 of FIG. 4;

FIG. 13 is a fragmentary cross-sectional view taken along the line 13—13 of FIG. 5;

FIG. 14A is a fragmentary cross-sectional view taken along the line 14A—14A of FIG. 3A;

FIG. 14 is a fragmentary cross-sectional view taken along the line 14—14 of FIG. 1; and FIG. 15 is a fragmentary cross-sectional view taken along the line 15—15 of FIG. 1, with the inner lining removed.

DETAILED DESCRIPTION OF THE PREFERRED EMBODIMENT

Figure 4:
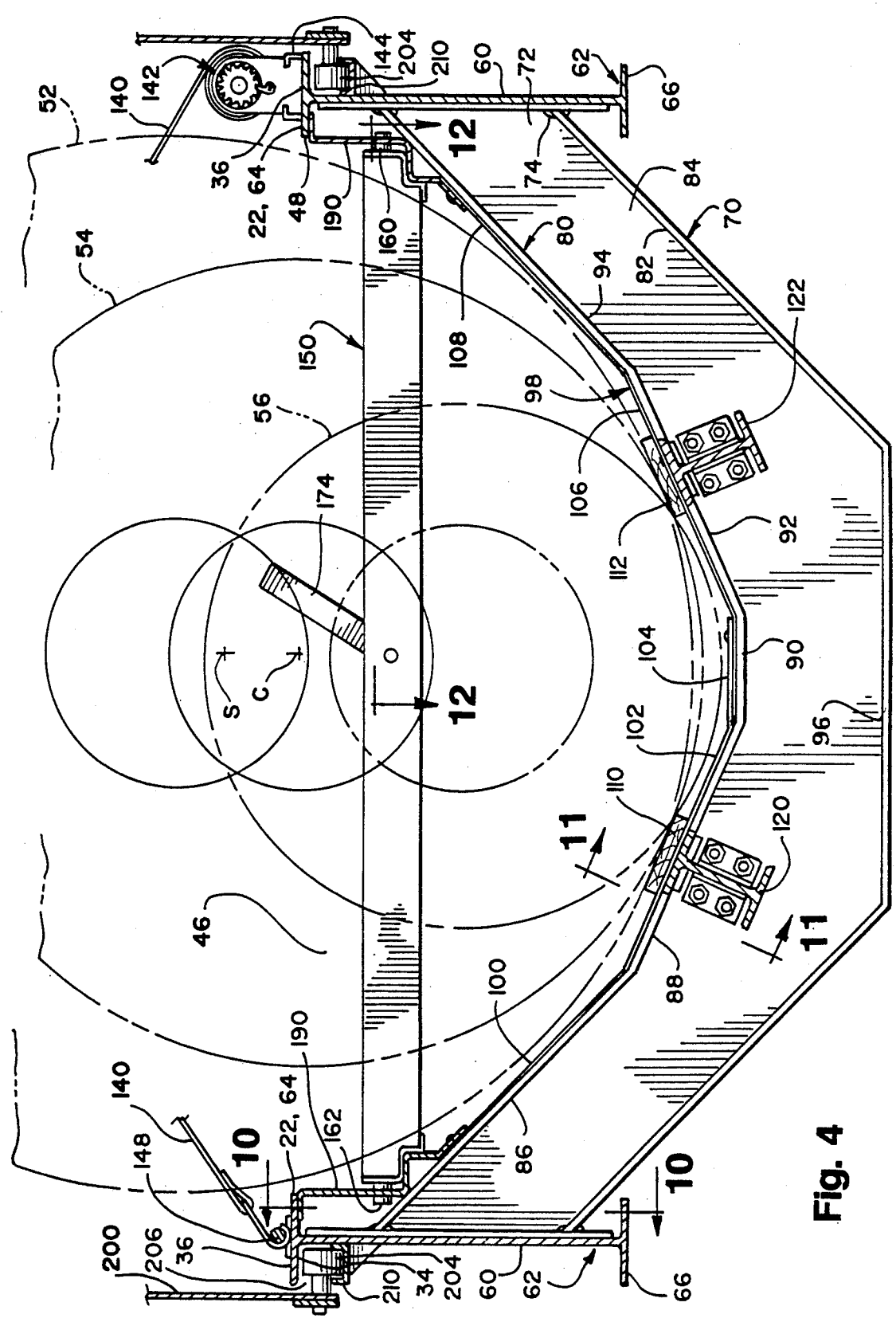
FIG. 4 is a fragmentary cross-sectional view taken along the line 4—4 of FIG. 3B.
Figure 5:
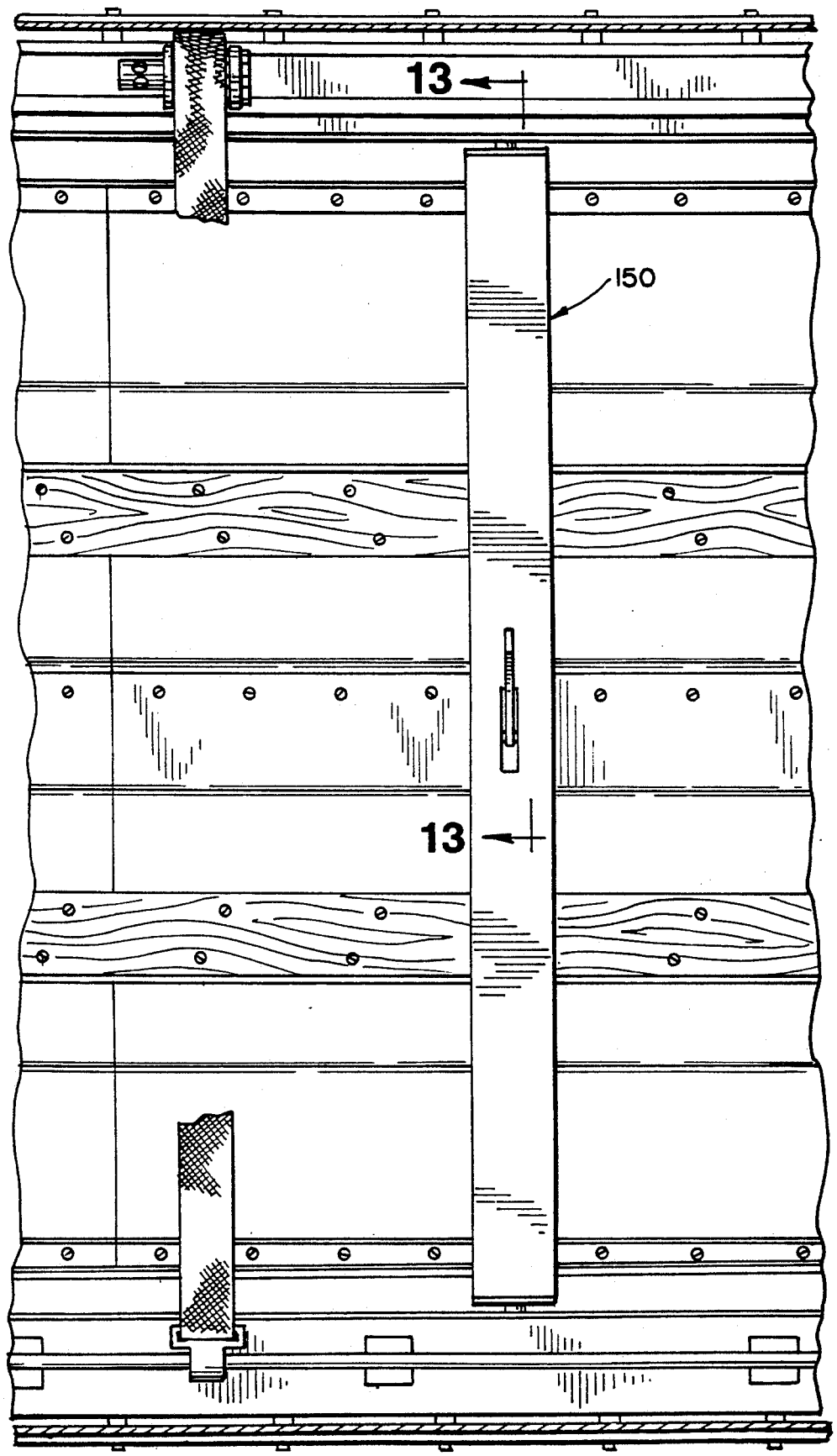
FIG. 5 is a fragmentary top plan view of the vehicular trailer apparatus, illustrating an adjustable load brace according to principles of the present invention.

Referring now to the drawings, and initially to FIGS. 1 and 2, a vehicular trailer apparatus is generally indicated at 10. Apparatus 10 includes front and rear end portions 12, 14. The front end 12 includes a conventional attachment to a fifth wheel of a tractor truck. Running gear generally indicated at 16 is located at the rear end portion of the vehicular trailer apparatus, and includes conventional axles, opposed sets of wheels and related suspension equipment.

Apparatus 10 further includes a frame generally indicated at 20 on which a platform 22 is installed. The platform 22 is of generally flat, planar configuration, having opposed front and rear end portions 26, 28 and a pair of opposed sides 30, 32. The platform includes an upper surface 36 which includes a generally trapezoidal rear deck 38 (see FIG. 1A) with a walkway portion 40 located between the opposed wheel sets of the running gear. With reference to FIG. 4, the platform upper surface 36 preferably includes the upper surface of an I-beam flange located adjacent the sides of the vehicular trailer apparatus. The lower surface 34 of the platform at the vehicular trailer apparatus sides comprises the underside surface of the same I-beam flange. The platform further includes the upper surface of a forward wall 42.

The platform 22 defines a central opening or recess 46 bordered by an edge 48 of the platform. The recess, according to one aspect of the present invention, is depressed below the upper surface of platform 22. Articles to be carried by the vehicular trailer apparatus are at least partly received in the recess, below the platform surface 36. For example, the vehicular trailer apparatus of the present invention is adapted for transporting articles having rounded surfaces, such as the steel coils 52-56 visible in FIGS. 2A and 2B. As will be seen herein, the frame 20 forms a cradle structure in the recess 46, for supporting the articles to be carried, and in particular articles such as the steel coils illustrated in the figures.

The frame 20 includes a pair of sidewalls 60. Preferably, the sidewall 60 comprises the central web of an I-beam construction. With brief reference to FIG. 4, the I-beam construction is generally indicated at 62 and includes the I-beam web or sidewall 60 located between an upper flange 64 and a lower flange 66. The upper flange 64 includes an upper surface 36, which forms a portion of the platform 22 on which workmen can step while loading and unloading the vehicular trailer apparatus.

Referring to FIGS. 1A or 2A, for example, the I-beam construction 62 extends the full length of the vehicular trailer apparatus, from the forward end 12 to the rearward end 14. As can be seen in the top plan views of FIGS. 1A and 2A, the I-beam construction is bent to form four vertical planes, a forward plane angled toward the longitudinal center line of apparatus 10, a major medial plane and a plane adjacent the running gear at the rear portion of apparatus 10, both generally parallel to the longitudinal center line. The I-beam further includes a transition portion immediately ahead of the running gear, to transition between the full width platform portion surrounding the recess 46, and the rear deck 38 overlying the running gear. The two I-beam constructions at either side of apparatus 10 are preferably mirror images of one another.

With additional reference to FIG. 4, the vehicular apparatus 10 is provided with hangers generally indicated at 70, which extend between the sidewalls 60 and having end portions attached thereto by suitable means such as welding. Referring to FIG. 4, the right-hand end portion 72 of hanger 70 is secured to sidewall 60 by a weld bead 74 and by bolted angle plates 75 which are welded to the sidewalls (see FIG. 15). As can be seen in FIGS. 1B and 2B, two hangers 70 are provided, located in the medial portion of recess 46. As can be seen in FIG. 4, the hanger 70 is located below the platform 22, being positioned below the recess 46 formed in the platform. As will be explained herein, the hangers 70 form part of a cradle structure located below the platform, for receiving articles to be carried in the vehicular trailer apparatus.

Referring again to FIG. 4, the hanger 70 preferably comprises an I-beam construction, with upper and lower flanges 80, 82 and an intermediate web 84. The upper flange 80 has five sides, while the lower flange 70 has three sides. The five sides 86-94 of the upper flange 80 includes end flange portions 86, 94 secured to sidewall 60 with the aforementioned weld bead and angle plates. A central flange portion 90 is aligned generally horizontal, parallel to a central portion 96 of lower flange 82. According to one aspect of the present invention, the hangers 70 include flange portions 88, 92 which are located below the platform, which are upwardly facing, and which are inclined toward one another, being angled toward a cross-sectional point at or above the longitudinal center line of platform 22. Referring to FIG. 4, the longitudinal center line of platform 22 appears as a point C in the cross-sectional view of FIG. 4. A sheet metal skin liner or flooring 98 covers the bottom of recess 46, and is formed to the upper flange 80 of hangers 70. Accordingly, the sheet metal flooring 98 has five surfaces which extend along the longitudinal direction of apparatus 10. The five portions 100-108 of flooring 98 overlie the five portions 86-94 of upper flange 80. Pads 110, 112 extend the length of recess 46, and are preferably made of wood material so as to cushion the steel coils. As can be seen in FIG. 4, the steel coils 52-56 all rest on pads 110, 112. Coils of softer steel may require pads of different, softer material.

Referring to FIG. 4, the vehicular trailer apparatus according to the present invention includes a pair of elongated I-beams 120, 122 having central webs aligned generally normal to the surface of the flooring portions 102, 106 with which they are associated. The I-beam support 120 has an upper flange crossing the upper flange 80 of hanger 70. As can be seen in FIGS. 11 and 15, the support beams 120 are preferably provided in sections, being joined to hangers 70 using tie plates 75, welded to the webs of the I-beams 120, 122 and secured by threaded fasteners 123 to the web 84 of the hangers 70. As can be seen in FIG. 15, the forward end 124 of beam support 120 is secured to forward wall 42 by conventional means, preferably welding. In a similar manner, the rearward ends 128, 130 of support beams 120, 122, respectively are secured to rearward wall 44, also by welding. As can now be seen, the mid-portions of support beams 120, 122 are supported by hanger members 70. Referring to FIG. 1A, a portion of the covering 98 is removed to expose the underlying hanger 70 and the support beams 120, 122. The flooring 98 is provided as a water barrier, and does not provide significant support for the payload carried in the recess 46.

Figure 8:
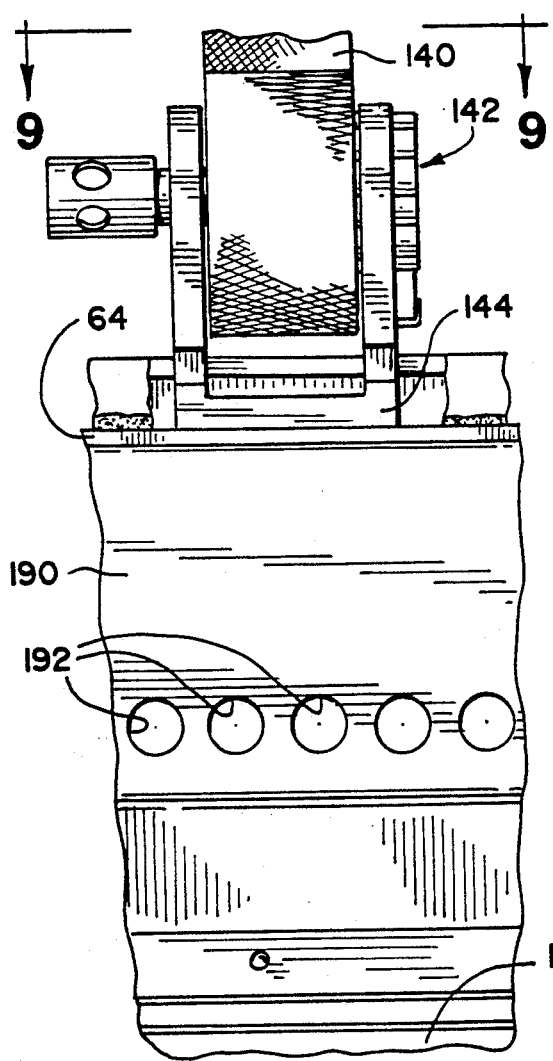
FIG. 8 is a fragmentary cross-sectional view taken along the line 8—8 of FIG. 1A.
Figure 9:
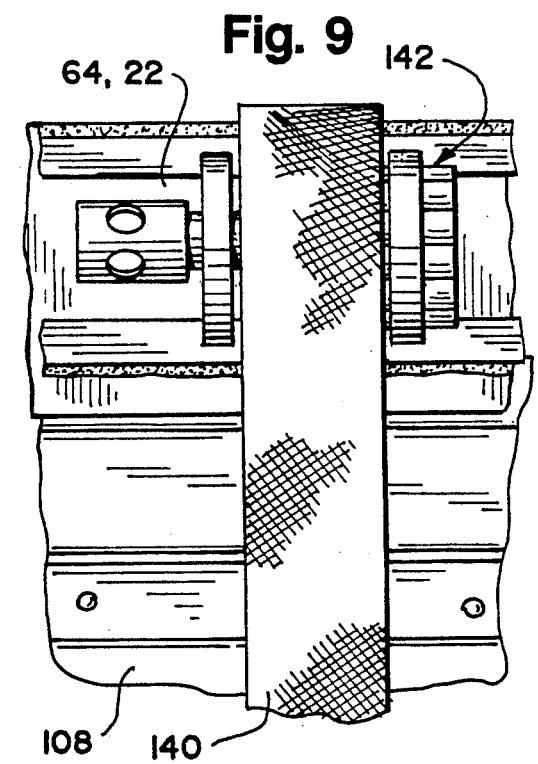
FIG. 9 is a top plan view of FIG. 8.

As can now be seen, payload such as the steel coils 52-56 are supported in a cradle formed by the open framework of hangers 70, support beams 120, 122 and also by the internal edge 48 of the platform 64. However, as illustrated in FIG. 4, the payload preferably contacts only the support pads 110, 112. However, as will be appreciated, the remaining portions of the hangers 70 and the interior edge of the platform 48 located at the upper end of the sidewalls 60 will operate to restrain the payload against lateral movement, should it shift within the vehicular trailer apparatus. To minimize and preferably eliminate such lateral shifting of the several payload articles, a series of straps 140 are located along the sidewalls 60. Preferably, the straps 140 are secured to the upper flange 64 of the I-beam structures 62. Referring to FIGS. 4 and 8 the strap is carried on a spool associated with a ratcheting mechanism 142. The ratcheting mechanism 142 is preferably carried in a slotted channel 144 which is welded to the upper flange 64. At the opposite fixed end, the safety straps 140 are secured by hooked members 146 to a tie-down bar 148 secured to the flange 64 of the opposed I-beam structure 62. The ratchet mechanism 142, illustrated in greater detail in FIGS. 8 and 9, is of conventional construction and will not be described further.

To further aid in restraining the steel coils or other payload against shifting in longitudinal directions, vehicular trailer apparatus according to the present invention preferably includes one or more adjustable load braces generally indicated at 150.

Referring additionally to FIGS. 12 and 13, the adjustable load braces have a generally hollow construction for weight reduction, including an upper wall 152, and sidewalls 154, 156. A series of internal partitions 158 are provided to strengthen the structure of the adjustable load brace 150, and to mount working components disposed therein. Working components include locking pins 160 having exposed, free ends 162 extending beyond the endwalls 164 of the adjustable load brace. As can be seen in FIG. 13, the endwall 164 is stepped, having a recessed portion 166, the advantage of which will be described shortly.

Figure 6:
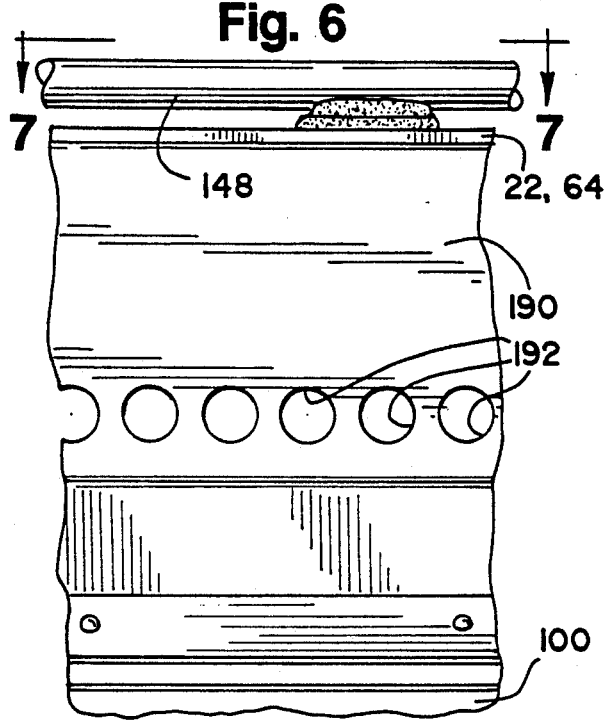
FIG. 6 is a fragmentary cross-sectional elevational view taken along the line 6—6 of FIG. 1A.
Figure 7:
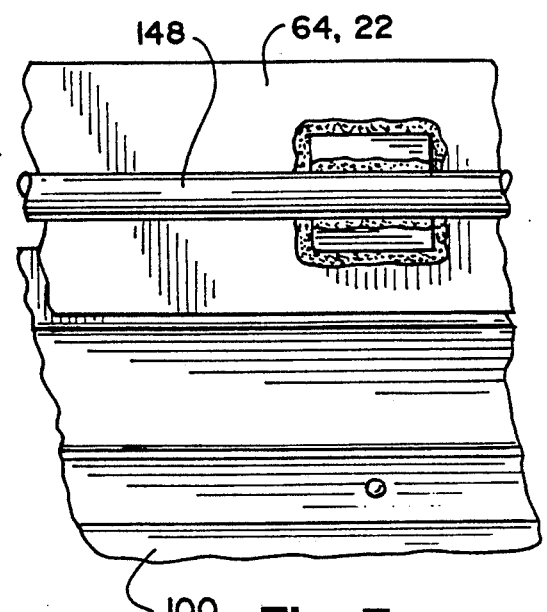
FIG. 7 is a fragmentary top plan view of FIG. 6.

The locking pins 160 have inner ends 170 which are connected to an operating handle 174 through linkage 172. The handle 174 is pivotally mounted to the sidewalls 154, 156 by a support shaft 178. Coil springs 180 bias the locking pins in an extended or locked position. Referring to FIG. 13, when handle 174 is moved in the direction of arrow 184, the locking pins are retracted, with the free ends 162 being recessed within or at least proximity located to endwall 164. The locking pins and linkage 172 is the same at each end of the adjustable load braces 150, and handle 174 operates to simultaneously retract the locking pins 160 at each end of the adjustable load brace. Referring to FIGS. 4, 5, 6 and 8, the flooring 98 has sides located spaced from the internal edge 48 of the platform, to accommodate stepped support walls 190, which have a shape complimentary to that of the stepped ends 164 of the adjustable load braces 150 so as to provide an interlocking engagement therewith. As can be seen in FIGS. 6 and 8, the support endwalls 190 are provided with a longitudinally extending series of circular apertures 192, dimensioned to receive locking pins 160.

Referring additionally to FIGS. 2A, 2B the coils 52, 56 or other payload is lowered into the recess 46, with the bottom of the article, herein the steel coils 52, 56 coming to rest on the support pads 110, 112. As illustrated in FIGS. 2A, 2B, the steel coils may be loaded from the front of the vehicular trailer apparatus. The steel coil 52 is loaded first, being positioned immediately adjacent the forward wall 42. Since the steel coil 52 is considerably shorter than the axial length of the recess 46, an adjustable load brace 150 provides convenient retention of the steel coil 52 against shifting in a rearward direction. The adjustable load brace 150 is lowered into the recess 46, with the step ends 164 thereof coming to rest on the stepped support walls 190.

During the installation of the adjustable support braces, the handles 174 are moved to a position to retract the locking pins 162. The adjustable load braces, and particularly the stepped endwalls 164 thereof, are slid along the stepped support walls 190, bringing the sidewalls of the adjustable support brace into contact with the rearward, annular side of the steel coil 52. The handles 174 are then released, allowing the springs 180 to advance the locking pins 160 into the nearest apertures 192 of the support walls 190, thus locking the adjustable load braces in position.

Thereafter, a second coil, coil 54, is loaded into the recess 46 and is advanced to contact the previously installed adjustable load brace. A second adjustable load brace is installed at the opposite, rearward annular side of the coil 54 to secure the steel coil in position. Thereafter, the remaining steel coil 56 is loaded and a third adjustable load brace is locked in the position, securing the coil 56 against axially rearward displacement. As can be seen in FIG. 2A, a portion of the recess 46 is left unfilled, although additional steel coils could be added if desired.

According to further aspects of the present invention, a removable cover generally indicated at 200 is installed once the coils are located in the vehicular trailer apparatus. The cover 200 is comprised of five sides, although the number of sides and configuration of the cover may be selected as desired. A lifting hook 202 is located at the center of the cover. Referring now to FIGS. 4 and 14A, roller guides 204 are mounted at the lower, free edges of cover 200. The roller guides 204 are received in a slotted channel 206 located adjacent the upper ends of sidewalls 60. In the preferred embodiment, the slotted channel 206 is preferably formed using the upper flange 64 of the I-beam structures 62, as the upper end of the slotted channel 206. The lower portion of the slotted channel is conveniently provided by welding a C-channel member 210 to the upper end of sidewall 60. The leading end 212 of cover 200 is advanced toward the front of the vehicular trailer apparatus, with the forward guide rollers 204 being introduced into the slotted channels 206, thus supporting the forward portion of the cover 200. As the cover is slid in a forward direction, increasingly greater portions of the cover are supported by the slotted channels 206 until the cover is slid to the fully installed positions indicated in FIGS. 3A, 3B. Suitable locking means, not shown, prevent retraction, or rearward sliding of the cover.

As mentioned above, the sidewalls 60 are preferably formed as portions of an I-beam structure 62. Thus, part of the upper flanges 64 protrude beyond the sidewall 60, although the amount of such protrusion is insignificant compared to the lateral dimensions of the vehicular trailer apparatus. It is thus preferred that the sidewalls 60 and the platform, preferably formed by the upper flange 64, be joined together at outside corners of the vehicular trailer apparatus. Thus, the vehicular trailer apparatus according to principles of the present invention is distinguished from prior art flat bed trailers, which have substantial portions of their upper platform overhanging or cantilevered laterally outside of the longitudinal support members of the trailers.

As can be seen by studying the present invention, and particularly the illustration of FIG. 4, the load bearing surfaces of the vehicular trailer apparatus are located between the outer sidewalls 60. Since significant portions of the payload are located below the platform of the vehicular trailer apparatus, thus lowering the center of gravity of a fully loaded tractor and trailer rig. Further, as mentioned above, the cradle structure supporting the payload acts to constrain payload articles, such as steel coils, having rounded surfaces, from lateral shifting or displacement.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following Claims.

What is claimed is:

1. Vehicular trailer apparatus for carrying articles, comprising:
   a platform having a pair of laterally opposed sides, front and rear end portions and opposed upper and lower surfaces extending between the sides and the front and rear end portions;
   sidewalls downwardly depending from the platform sides to form outside corners at the upper surface of the platform, at a joinder of the sidewalls and platform sides;
   said platform including at least one interior edge forming an internal recess in said platform;
   a plurality of cradle shaped hangers extending between and attached to said sidewalls, below said platform and including a pair of laterally opposed, upwardly facing support surfaces inclined toward one another and located below said platform recess;
   forward and rearward endwalls downwardly extending from said platform;
   a pair of elongated support beams supported by each said hanger and having forward and rearward ends supported by said forward and rearward endwalls, said elongated support beams including laterally spaced apart, upwardly facing support surfaces for supporting said articles; and
   said support beams and said platform interior edges forming a pocket for receiving said articles to be carried by said vehicular trailer apparatus.

2. The apparatus of claim 1 wherein said laterally spaced apart upwardly facing support surfaces of said elongated support beams cooperate with said hanger support surfaces to support articles disposed in said recess.

3. The apparatus of claim 1 further comprising I-beam side members at each side of said apparatus, said I-beam members including central webbing portions comprising said sidewalls and upper flanges comprising a portion of said platform.

4. The apparatus of claim 3 wherein each said hanger means comprises at least one concave I-beam hanger member having opposed end portions which are upwardly and outwardly inclined, joined to said I-beam side members.

5. The apparatus of claim 4 wherein the end portions of said I-beam hanger member are joined to the webbing portions of said I-beam side members.

6. The apparatus of claim 4 wherein said I-beam hanger member includes a generally horizontal mid portion between said end portions.

7. The apparatus of claim 1 wherein said support beams have an I-shaped cross-section and an upper flange with an upper surface comprising said laterally spaced apart upwardly facing support surfaces of said support beams.

8. The apparatus of claim 1 further comprising a cover means covering said recess.

9. The apparatus of claim 8 wherein said cover includes lower edge portions for engaging the I-beam side members.

10. The apparatus of claim 9 wherein said cover means has a rigid hollow body.

11. The apparatus of claim 10 wherein said apparatus further comprises track means mounted to at least one of said platform and said sidewalls, and said cover means further includes roller means received in said track means.

12. The apparatus of claim 10 wherein said cover means includes a lifting hook at an upper portion thereof.

13. The apparatus of claim 1 further comprising a rear end portion coupled to said rear end portion of said platform.

14. The apparatus of claim 13 wherein said rear portion includes running gear having a pair of opposed wheel sets.

15. The apparatus of claim 14 wherein said platform extends over said rear end portion forming a walkway between said opposed wheel sets.

16. The apparatus of claim 5 wherein each said hanger includes a bottom edge having three sides.

17. The apparatus of claim 1 wherein said apparatus further comprises stepped support walls attached to said platform and said hangers.

18. The apparatus of claim 17 further comprising adjustable load brace means extending between said stepped support walls and adapted for selectable locking engagement with said stepped support walls.

19. The apparatus of claim 18 wherein said adjustable load brace means comprises an elongated double ended body having retractable locking pins outwardly extending from the ends of the body in a plane substantially parallel with a plane containing the elongated body.

* * * * *